(12) United States Patent
Gille

(10) Patent No.: US 6,386,982 B1
(45) Date of Patent: May 14, 2002

(54) CROSS MEMBER UNIT WITH CENTERING ELEMENT

(75) Inventor: Wilfried Gille, Dorsten (DE)

(73) Assignee: Spicer Gelenkwellenbau GmbH & Co. KG (DE)

(*) Notice: Subject to any disclaimer, the term of this patent is extended or adjusted under 35 U.S.C. 154(b) by 34 days.

(21) Appl. No.: 09/660,277

(22) Filed: Sep. 12, 2000

(30) Foreign Application Priority Data

Sep. 13, 1999 (DE) .......................... 199 43 653
Jul. 24, 2000 (DE) .......................... 100 36 203

(51) Int. Cl.[7] ................................ F16D 3/16
(52) U.S. Cl. .................. 464/127; 464/132; 464/905
(58) Field of Search .................... 464/127, 112, 464/128, 132, 134; 469/905, 136

(56) References Cited

U.S. PATENT DOCUMENTS

| | | | |
|---|---|---|---|
| 1,705,731 A | * 3/1929 | Hufferd | 464/127 |
| 1,943,814 A | 1/1934 | Cutting | |
| 1,987,415 A | * 1/1935 | Padgett | 464/127 |
| 2,217,082 A | * 10/1940 | Swenson | 464/127 |
| 3,178,907 A | 4/1965 | Lyons | |
| 3,204,428 A | 9/1965 | Stokely | |
| 3,470,711 A | 10/1969 | Kayser | |
| 3,651,663 A | 3/1972 | Lange et al. | |
| 3,950,834 A | * 4/1976 | Pitner | 464/127 |
| 4,050,130 A | * 9/1977 | Pitner | 464/127 |
| 5,989,125 A | 11/1999 | Lindenthal | |

FOREIGN PATENT DOCUMENTS

| | | |
|---|---|---|
| DE | 1941975 | 3/1971 |
| DE | 2440281 A1 | 2/1975 |
| DE | 2555667 | 7/1976 |
| DE | 2838235 A1 | 3/1979 |
| DE | 3524373 C2 | 12/1987 |
| DE | 4439998 A1 | 5/1996 |
| DE | 19718896 A1 | 11/1998 |
| EP | 0 785 370 A1 | 11/1996 |
| JP | 60030829 | 2/1985 |
| JP | 9-60650 | 3/1997 |

* cited by examiner

Primary Examiner—Lynne H. Browne
Assistant Examiner—Kenn Thompson
(74) Attorney, Agent, or Firm—Harness, Dickey & Pierce, P.L.C.

(57) ABSTRACT

A cross member unit (9) has a cross member (10) with four arms (11). Two each are centered on axes (y, z) extending perpendicular relative to one another. The two arms (11) of one axis (y, z) are received in one yoke arm (19) of a joint yoke. Each arm (11) is associated with a bearing bush (13) rotatably supported by rolling contact members (14). A centering element (23), with a pressure element (29) and a spring element (28), are positioned in each arm. The spring element (28) is supported against the arm (11) and loads the bearing bush (13) via the pressure element (29). The bearing bushes (13) associated with one axis (y, z) are received in the two yoke arms (19) of a joint yoke. If the yoke arms (19) are deformed due to rotational-speed-related centrifugal forces, the pressure elements (29) remain in contact with the bearing bushes (13). In this way, the cross member unit (9) is held in a centered way relative to the joint yoke.

16 Claims, 4 Drawing Sheets

CROSS MEMBER UNIT WITH CENTERING ELEMENT

CROSS-REFERENCE TO RELATED APPLICATION

This application is based upon and claims priority to German Patent Application 199 43 653.3 filed Sep. 13, 1999, and German Patent Application 100 36 203.6 filed Jul. 24, 2000, which applications are herein expressly incorporated by reference.

BACKGROUND OF THE INVENTION

The invention relates to a cross member unit for connecting two joint yokes of a universal joint. The cross member unit includes a cross member with four arms. Two arms are arranged on each common axis. A bearing bush is provided on each arm. Also, rolling contact members rotatably support the bearing bushes on the arms.

DE 44 39 998 A1 illustrates a cross member unit with a cross member having four arms. Each arm has a bearing bush rotatably supported on the arm by rolling contact members. A spring element is provided per arm. The spring element is supported between the inner base face of the bearing bush and the arm. The contact face of the spring element is spherical. Thus, the contact with the inner base face is point-like. The spring element is manufactured from high-tensile plastics. The purpose of using the spring element is to compensate for an assembly-related tolerance. At the same time, the spring permits the arm to escape elastically in the bearing bush.

DE 197 18 896 A1 discloses a universal joint having a first joint yoke, a second joint yoke and a cross member. Pairs of arms are arranged on the two axes positioned perpendicularly relative to one another. The joint yokes are pivotably supported on the axes via bearings mounted in the bearing eyes of the joint yokes. The bearings have bearing bushes and rolling contact members. The bearings and the cross member form the unit commonly referred to as cross member unit.

In the case of heavy driveshafts with diameters in excess of 200 mm, the balancing qualities commonly required today can only be guaranteed for speeds up to 2000 rpm.

SUMMARY OF THE INVENTION

It is the object of the present invention to provide a cross member unit which ensures improved centering in connection with the joint yokes at higher speeds.

In accordance with the invention, a cross member unit to connect two joint yokes of a universal joint includes a cross member with four arms. Two arms each form a pair. Each pair of arms is centered on a common axis. Each arm includes a cylindrical outer face and an end face. Each arm has a bore centered on the respective axis. The bore starts from the end face. The two axes extend perpendicularly relative to one another. A bearing bush is on each arm. The bearing bush includes a cylindrical casing and a base which closes the casing at one end. The housing has an inner base face arranged opposite the associated end face of the arm. Rolling contact members rotatably support the bearing bush on the associated arm. A centering element is inserted into the bore on each arm. The centering element includes a spring element and a pressure element. The pressure element has a contact face and a connecting channel to enable passage of a lubricant. The spring element is supported against the arm and loads the pressure element. The contact face of the pressure element projects beyond the end face of the arm and is in contact with the inner base face. The contact face is of a friction bearing material. Due to the pretension generated by the spring elements, the centering elements remain in contact with the inner base faces of the bearing bush even if the joint yokes of a universal-jointed shaft are deformed due to centrifugal forces. As a result, the cross member unit is accurately centered on the axis of rotation of the universal-jointed shaft relative to the joint yoke. The solution in accordance with the invention achieves the required balancing qualities even for speeds up to 4000 revolutions per minute.

In a preferred embodiment, the housing of the centering element is tubular in shape. At one end of the housing, it has a first collar which extends outwardly from the axis of the arm. At the other end of the housing, a second collar extends inwardly towards the axis. The housing is inserted in a centered way into the bore of the arm on the axis. The first collar is supported against the arm. The second collar supports the spring element. An annular gap exists between the circumferential face of the pressure element and the housing. The connecting channel is provided in the form of a first bore. The bore is centered on the axis on the side of the pressure element facing the housing. At least one second bore communicates with the first bore and which, in turn, communicates with the annular gap.

In a preferred embodiment, the contact face of the pressure element is spherical in shape. The contact of the pressure element with the inner base face of the arm is point-like and centered on the axis. As a result of this design measure, a relative movement between the pressure element and the bearing bush is reduced to a minimum.

According to an alternative embodiment, the contact face of the pressure element is planar. The contact between the contact face and the inner base face of the bearing bush is a surface contact. In this way, the axial force between the bearing bush and the pressure element is distributed over a larger surface. Thus, the development of heat and the amount of wear per surface unit is reduced to a minimum.

According to an alternative embodiment, the pressure element includes a cylindrical portion as well as a collar with an annular collar face. Also, a recess with a shoulder is formed in the bore of the arm, in its region adjoining the end face. Further, the outer diameter of the cylindrical portion is adapted to the diameter of the bore. The collar face is supported against the spring element which, in turn, is supported against the shoulder.

The connecting channel of the pressure element is a through-bore centered on the axis. The connecting channel connects the end face with the contact face. The pressure element has at least one groove arranged in the contact face. The groove extends from the through-bore to the circumferential face of the collar. A continuous annular groove is provided in the circumferential face of the cylindrical portion of the pressure element. The continuous annular groove contains a sealing ring that has a sealing effect relative to the bore wall.

The above characteristics allow lubricant to pass through the connecting channel and the grooves into the recess of the bore of the arm. In the case of pressure elements with a planar contact face and surface contact with the inner base face of the bearing bush, it is advantageous that the lubricant reaches the contact zone. As a result, the friction between the two components is reduced to a minimum. Accordingly, the wear of the pressure element is reduced. Consequently, the service life of the parts is increased. Even with high axial pre-tensioning forces and high torques of the driveshaft, the bearing bush remains in its predetermined position relative to the associated arm.

According to a further embodiment, the friction moment which occurs between the contact face and the inner base face, when the bearing bush pivots around the axis relative to the arm, is lower than the friction moment between the pressure element and the spring element as well as between the latter and the arm. This ensured that the pivot movement only occurs between the pressure element and the bearing bush. The pressure element does not rotate relative to the spring element and the arm when the driveshaft is in operation.

According to a further embodiment, the centering element includes an annular disc. The annular disc is supported against the collar face on one side and against the spring element on the other. This disc ensures surface contact between the collar face and the spring element. Without the disc, undesirable settlement symptoms may occur between the spring element and the pressure element. Also, the disc does not rotate relative to the spring element and the arm when the driveshaft is in operation.

Furthermore, the pressure element includes friction bearing material. The friction bearing material, as the base material, includes at least one thermoplastic plastic material and, in the form of admixtures, at least carbon fibers and/or polytetrafluoroethylene (PTFE) and/or carbon. Carbon and PTFE increase the temperature resistance and the wear resistance of the base material. PTFE has good sliding properties. This has a friction-reducing effect on the contact zone between the inner base face and the contact face. The spring element is supported against the housing on one side and against the pressure element on the other. The spring element has a plate spring or a package of plate springs.

The centered bores that extend in the axes of the arms are in the form of through-bores. A lubrication nipple is provided at the point of intersection between the axes. The lubricating nipple connected to the cross member unit provides grease to the rolling contact bearings. The grease is provided through the bores in the four arms which extend in a centered way along the axes and through the bores in the pressure elements. Supplying the rolling contact bearings with grease reduces the amount of wear and increases the service life. A substantial advantage of the described invention is that the centering elements can be inserted subsequently into existing cross member units.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment will be described below with reference to the drawing wherein.

DETAILED DESCRIPTION OF THE PREFERRED EMBODIMENT

Figure 1:
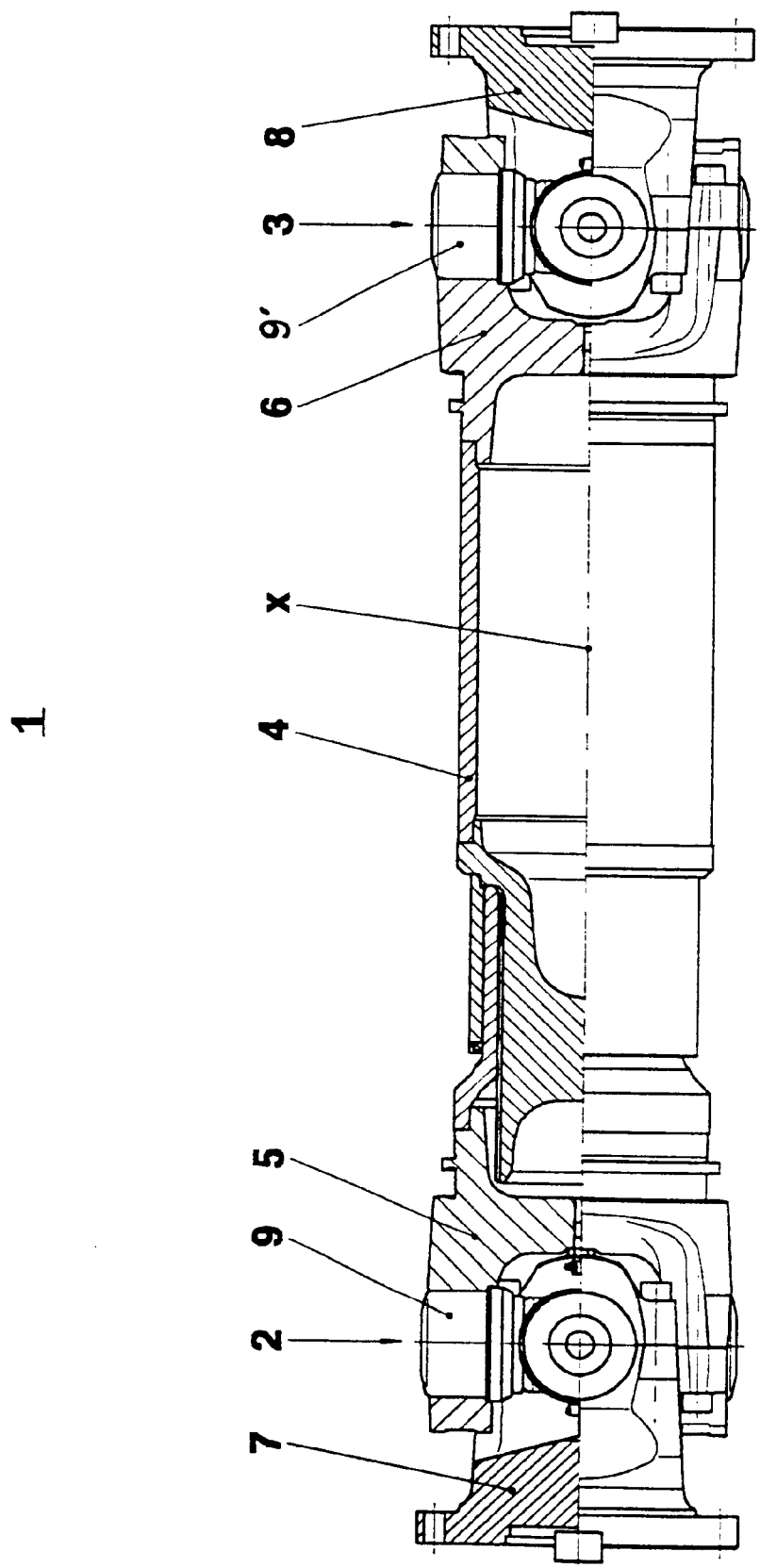
FIG. 1 is a partial longitudinal section view through a universal-jointed shaft.

FIG. 1 shows a universal-jointed shaft 1 which includes two universal joints 2, 3. A shaft 4 connects the two universal joints 2, 3. The shaft enables a change in the distance between the two joints. The two universal joints 2, 3 are arranged so as to be centered on a rotational axis x. Each joint includes a first joint yoke 5, 6. The yoke is firmly connected to the shaft 4. A second joint yoke 7, 8 is connected to a gearbox. A cross member unit 9, 9' pivotably supports the first joint yoke 5, 6 and the second joint yoke 7, 8.

Figure 2:
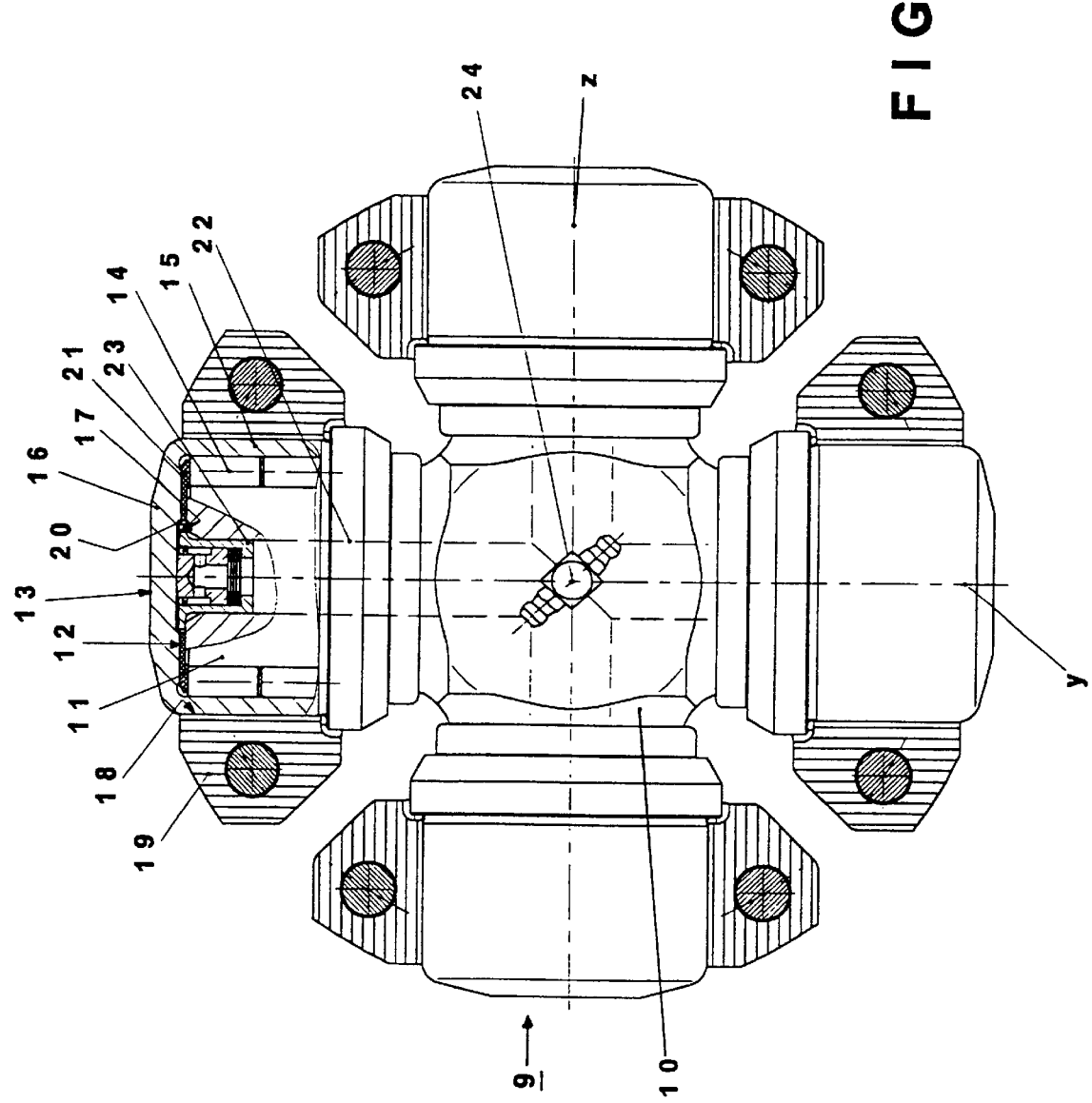
FIG. 2 is a side view partially in section of a cross member unit according to FIG. 1.

FIG. 2 shows a cross member unit 9 with a cross member 10 with four arms 11. Each arm is provided with a cylindrical outer face and an end face 12. Two arms 11 each are centered on a common axis y, z. The two axes are positioned in one plane and intersect one another at a right angle. In a design variant of the cross member unit 9, the two axes y, z can also intersect one another perpendicularly at a distance from one another.

A bearing bush 13 is centered and pivotably supported by rolling contact members 14 on each arm 11. The bearing bush 13 includes a cylindrical casing 15 and a base 16. The base 16 closes the cylindrical casing 15 at one end. An inner base face 17 is positioned opposite the end face 12 of the arm 11. The bearing bushes 13 associated with an axis y, z are received in the bearing eyes 18 of the two yoke arms 19. The bearing bushes are secured in the direction of the arm axes y, z. An annular stop disc 21 is centered on the axes between the inner base face 17 of the bearing bush 13 and the end face 12 of the arm 11. The annular stop disc 21 helps to reduce friction. The annular stop disc 21 includes lubricating grooves. The grooves extend from its central bore 20 to its outer circumference.

Centered bores 22 are provided on each of the arms 11 of the cross member 10, on the axes y, z. A centering element 23 is received in each bore 22. The bores 22 are preferably through-bores and at their points of intersection, they are connected to a lubricating nipple 24. The nipple 24 enables supply of grease.

Figure 3:
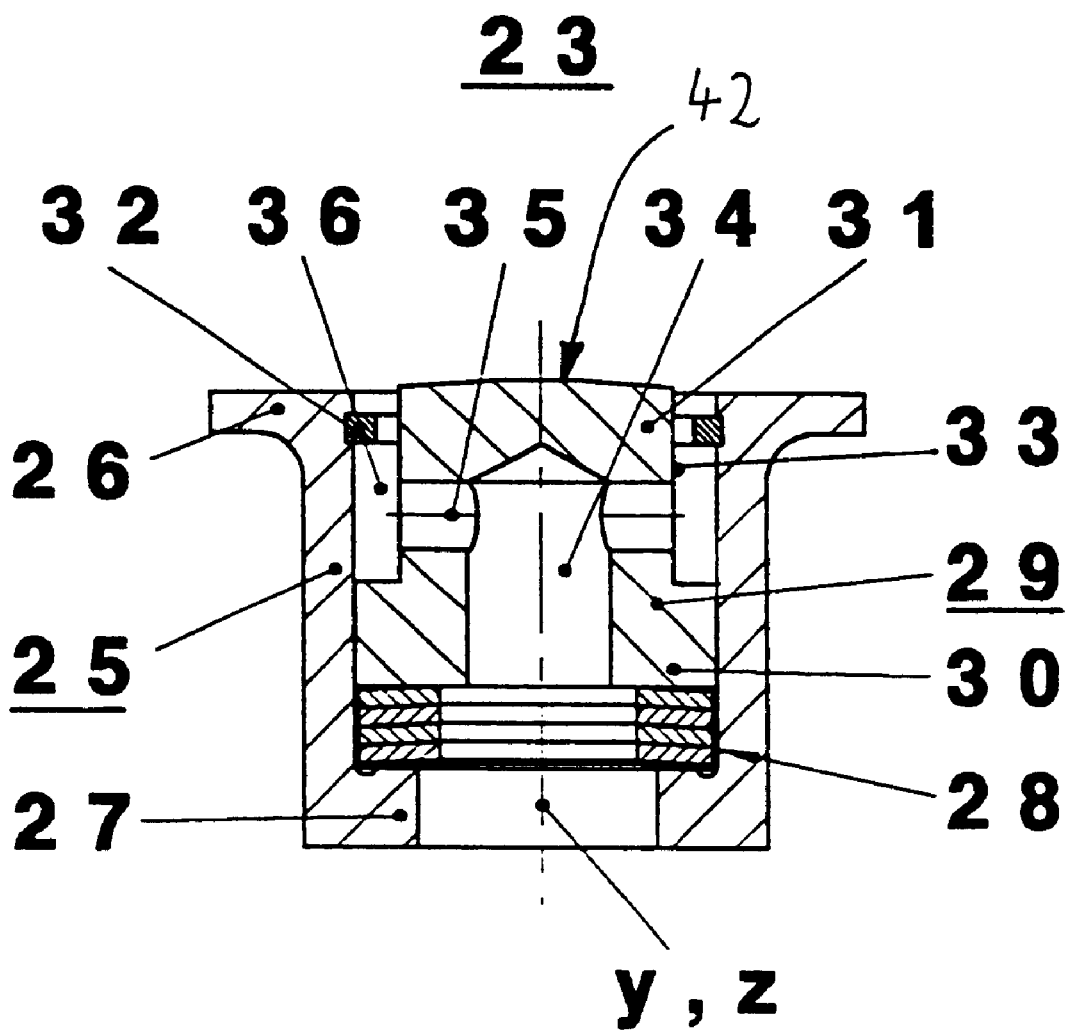
FIG. 3 is a longitudinal section view through a centering element according to FIG. 2.

FIG. 3 shows a centering element 23. Each centering element includes a tubular housing 25. At its first end, the housing has a first collar 26 extending outwardly from the axis y, z. At the second end of the housing, a second collar 27 extends inwardly towards the arm axis y, z. The outer diameter of the tubular housing 25 corresponds to the diameter of the bore 22 of the arm 11. The centering element 23 can thus be inserted into the bore 22 of the arm 11. The centering element is centered on the axis y, z and is flush with the bore 22. The first collar 26 supports the centering element 23 against the end face 12 of the arm 11.

A spring element 28 is positioned in the tubular housing 25. The spring element 28 is in the form of a package of plate springs. The plates are supported against an inwardly extending second collar 27. An axially displaceable pressure element 29 biased by the plates is centered on the axis y, z.

The pressure element 29 includes a first end 30 resting on the spring element 28. A second end 31, having a spherical shape, is supported against the inner base face 17 of the bearing bush 13. Via the second spherical end 31, the pressure element 29 passes through the central bore 20 of the stop disc 21. During the assembly of the universal joint 2, 3, the spring element 28 is pre-tensioned. As a result of the centrifugal forces which occur during the rotation of the shaft, which cause the yoke arms 19 to be displaced away from the rotational axis x, the pressure elements 29, loaded by the spring element 28, remains in contact with the inner base faces 17 of the bearing bushes 13. The spherical shape of the contact face 42 enables the contact face, between the pressure element 29 and the size of the inner base face 17 of the bearing bush 13 to be reduced to a minimum. The spherical face is centered due to its arrangement on the axis y, z of the arm 11. In consequence, the amount of heat developing at the contact face 42 and caused by friction of the pivoting bearing bush 13 is kept low and the amount of wear is minimized.

The pressure element 29, at its second end, includes a cylindrical step 33. Thus, an annular gap 36 is formed between the outer face of the second end 31 of the pressure element 29 and the housing 25. A securing ring 32 secures the pressure element 29 in the axial direction. This prevents the pressure element 29 from slipping out of the housing 25 during assembly. At its first end 30, the pressure element 29 has a first bore 34 centered on the axis y, z. A second bore 35 connects the first bore 34 to the annular gap 36. The first bore 34 communicates with the bore 22 of the arm 11. This measure enables the rolling contact members 14 to be supplied with lubricant and it reduces the amount of wear.

The tolerances of the housing 25, the spring element 28 in the form of a package of plate springs, the pressure element 29, and the stop disc 21 are such that, with the bearing bush 13 mounted under pre-tension on the arm 11, a gap is formed between the first collar 26 of the housing 25 and the bearing bush 13.

Figure 4:
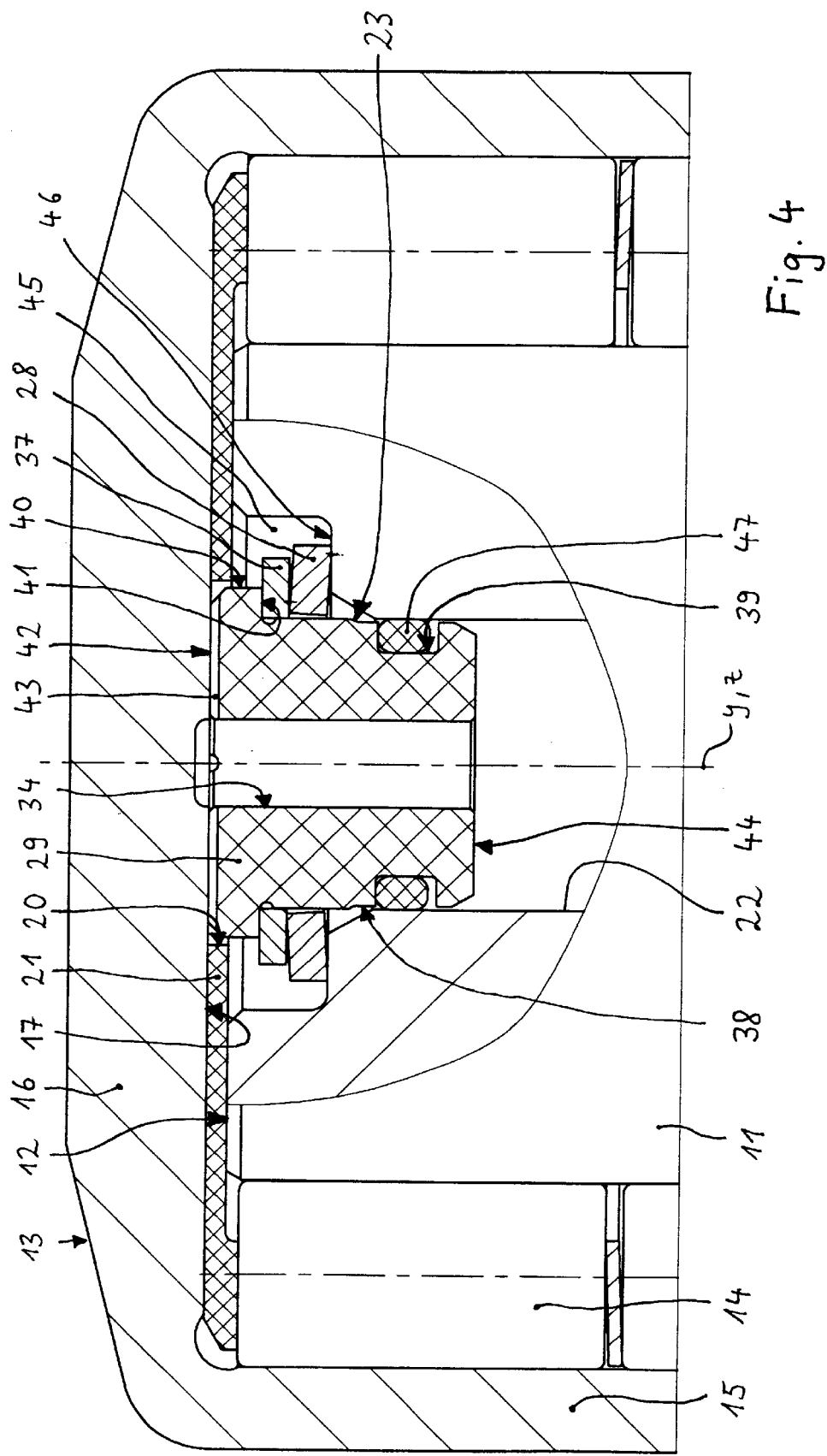
FIG. 4 is an enlarged section view of an arm according to FIG. 1 with a simple centering element.

FIG. 4 shows an embodiment of the centering element 23 without a housing. The centering element 23 includes a pressure element 29, a spring element 28 and an annular disc 37. The pressure element 29 is centered on one of the axes y, z. The pressure element 29 includes a cylindrical portion 38 with a continuous annular groove 39, a collar 40 with a collar face 41, a contact face 42 with grooves 43, an end face 44 as well as a connecting channel 34. The connecting channel 34 is in the form of a through-bore centered on the axis y, z and connects the end face 44 with the contact face 42.

The pressure element 29 includes a friction bearing material. A thermoplastic plastic material is the base material. Carbon and/or PTFE are mixed with thermoplastic. Carbon and PTFE serve to improve the sliding properties of the base material. Furthermore, PTFE, in particular, increases the wear resistance and the temperature resistance of the pressure element 29.

In the region adjoining the end face 12 of the arm 11, the bore 22 includes a recess 45 with a shoulder 46. The centering element 23 is inserted into the bore 22 of the arm 11. The pressure element 29 is supported by a collar face 41 against the annular disc 37. The annular disc 37 is supported against the spring element 28. The spring element 28 is supported against the shoulder 46 of the arm 11. The disc 37 is a high-tensile steel. The disc 37 serves as a spacing ring to compensate for production-related dimensional tolerances. Also, the disc 37 prevents any settlement symptoms caused by high axial forces between the spring element 28 and the softer pressure element 29.

In the region of transition towards the end face 44, the cylindrical portion 38 of the pressure element 29 is given a conical shape. The conical shape facilitates insertion into the bore 22 of the arm 11. For the same reason, the bore wall of the bore 22 in the region of transition towards the shoulder 46 are given a conical shape.

A sealing ring 47 is inserted into the annular groove 39. The sealing ring 47 seals the gap between the pressure element 29 and the bore wall. At the same time, facilities overhead-assembly when fitting the centering element 23 in the bore 22.

By sealing the gap between the pressure element 29 and the bore wall, it is possible for lubricant to pass through the connecting channel 34 and the grooves 43 into the recess 45. The lubricant serves to minimize the friction forces between the contact face 42 and the inner base face 17. Thereafter, the lubricant passes through the lubricating grooves in the annular stop disc 21 to the rolling contact members. The annular stop disc 21 is arranged between the inner base face 17 and the end face 12 to optimize the friction conditions between the components and to hold the rolling contact members. The stop disc 21 includes a bore 20. The pressure element 29 passes through the bore 20.

The centering element 23 reduces the amount of wear of the pressure element 29. Thus, the pressure element 29 can be loaded with high tensioning forces by the spring element 28. When displacing the yoke arm 19 away from the rotational axis x, which displacement is caused by the rotational-speed-dependent centrifugal forces, the pressure elements 29, loaded by the spring elements 28, also move away from the rotational axis x. The contact faces 42 remain in contact with the inner base faces 17. In this way, the cross member unit is held and centered on the rotational axis x relative to the joint yoke. The required balancing grades (Q 16) can thus be achieved even for speeds up to 4000 revolutions per minute.

While the above detailed description describes the preferred embodiment of the present invention, the invention is susceptible to modification, variation and alteration without deviating from the scope and fair meaning of the subjoined claims.

What is claimed is:

1. A cross member unit for connecting two joint yokes of a universal joint comprising:

a cross member with four arms, two arms each form a pair, each pair of arms being centered on a common axis, said two axes extend perpendicularly relative to one another, each arm including a cylindrical outer face and an end face, each arm having a bore centered on its respective axis, said bores starting from the end face;

a bearing bush coupled with each arm, said bearing bush including a cylindrical casing and a base which closes said casing at one end, an inner base face arranged opposite the associated end face of the arm, rolling contact members rotatably supporting the bearing bush on the associated arm; and a centering element on each arm inserted into the bore, said centering element including a spring element and a pressure element with a contact face and a connecting channel to enable passage of a lubricant, said spring element supported against the arm and loading the pressure element, said contact face of a friction bearing material projecting beyond the end face of the arm and being in contact with the inner base face.

2. A cross member unit according to claim 1, wherein each centering element includes a housing, said pressure element positioned in said housing so as to be axially displaceable and loaded by said spring element.

3. A cross member unit according to claim 2, wherein the housing of the centering element is tubular in shape, at one end, said housing has a first collar extending outwardly from the axis of the arm, at another end, said housing has a second collar extending inwardly towards the axis, said housing inserted in a centered way into the bore of the arm on the axis, said first collar supported against the arm and said second collar supporting the spring element.

4. A cross member unit according to claim 1, wherein the contact face of the pressure element is a spherical shape and the contact of the contact face with the inner base face of the arm is point-like and centered on the axis.

5. A cross member unit according to claim 2, wherein an annular gap is formed between the circumferential face of the pressure element and the housing, a connecting channel in the form of a first bore on the side of the pressure element facing the housing is centered on the axis and at least one second bore communicating with said first bore, said first bore communicating with the annular gap.

6. A cross member unit according to claim 1, wherein the pressure element comprises a cylindrical portion and a collar with an annular collar face, the bore in its region adjoining the end face includes a recess with a shoulder, and the outer diameter of the cylindrical portion is adapted to the diameter of the bore, and the collar face being supported against the spring element with said spring element being supported against the shoulder.

7. A cross member unit according to claim 6, wherein the connecting channel of the pressure element being a through-bore which is centered on the axis and said connecting channel connects the end face with the contact face, said pressure element including at least one groove arranged in the contact face and extending from the through-bore to the circumferential face of the collar.

8. A cross member unit according to claim 1, wherein the contact face of the pressure element is planar and that the contact between the contact face and the inner base face of the bearing bush is a surface contact.

9. A cross member unit according to claim 6, wherein a continuous annular groove being in the circumferential face of the cylindrical portion of the pressure element, said groove including a sealing ring sealing the bore wall.

10. A cross member unit according to claim 6, wherein the friction moment occurring between the contact face and the inner base face when the bearing bush pivots around the axis relative to the arm is lower than the friction moment between the pressure element and the spring element as well as between the spring element and the arm.

11. A cross member unit according to claim 6, wherein the centering element includes an annular disc supported against the collar face and against the spring element.

12. A cross member unit according to claim 1, wherein the pressure element including a friction bearing material.

13. A cross member unit according to claim 12, wherein the friction bearing material, as the base material, contains at least one thermoplastic plastic material.

14. A cross member unit according to claim 13, wherein the friction bearing material, in addition to the base material, contains at least carbon fibers and/or polytetrafluoroethylene (PTFE) and/or carbon.

15. A cross member unit according to claim 1, wherein the spring element being a plate spring or a package of plate springs.

16. A cross member unit according to claim 1, wherein the bores being through-bores in which a lubricating nipple is arranged at intersection of the axes.

\* \* \* \* \*